US012522839B2

United States Patent
Yan et al.

(10) Patent No.: US 12,522,839 B2
(45) Date of Patent: Jan. 13, 2026

(54) **USE OF ZLMYB1 AND ZLMYB2 GENES FROM *ZIZANIA LATIFOLIA* IN INCREASING ANTHOCYANIDIN CONTENT OF RICE SEED**

(71) Applicants: TOBACCO RESEARCH INSTITUTE OF CAAS, Shandong (CN); WUHAN TIANWEN BIOTECHNOLOGY CO., LTD., Hubei (CN)

(72) Inventors: Ning Yan, Qingdao (CN); Qianqian Qi, Qingdao (CN); Yali Li, Qingdao (CN); Xi Chen, Qingdao (CN); Wanhong Li, Qingdao (CN); Yanning Xie, Qingdao (CN); Yongmei Du, Qingdao (CN); Hongbo Zhang, Qingdao (CN); Zhongfeng Zhang, Qingdao (CN)

(73) Assignees: TOBACCO RESEARCH INSTITUTE OF CAAS, Qingdao (CN); Wuhan Tianwen Biotechnology Co., Ltd., Wuhan (CN)

( * ) Notice: Subject to any disclaimer, the term of this patent is extended or adjusted under 35 U.S.C. 154(b) by 89 days.

(21) Appl. No.: 18/540,687

(22) Filed: Dec. 14, 2023

(65) Prior Publication Data
US 2024/0352474 A1 Oct. 24, 2024

(30) Foreign Application Priority Data
Apr. 21, 2023 (CN) .......................... 202310429222.4

(51) Int. Cl.
C07K 14/415 (2006.01)
A01H 5/10 (2018.01)
A01H 6/46 (2018.01)
C12N 15/82 (2006.01)

(52) U.S. Cl.
CPC ................................. *C12N 15/825* (2013.01)

(58) Field of Classification Search
CPC ...................................................... C12N 15/825
See application file for complete search history.

(56) References Cited

FOREIGN PATENT DOCUMENTS

CN 116555333 A * 8/2023 ............... A01H 5/10

* cited by examiner

Primary Examiner — Anne Kubelik
Assistant Examiner — Victoria L Deleo
(74) Attorney, Agent, or Firm — Howard & Howard Attorneys PLLC

(57) ABSTRACT

The present disclosure belongs to the technical field of plant genetic engineering. An objective of the present disclosure is to increase an anthocyanidin content of a rice seed. The present disclosure provides use of ZlMYB1 and ZlMYB2 genes from *Zizania latifolia* in increasing an anthocyanidin content of a rice seed, where the ZlMYB1 gene has the nucleotide sequence set forth in SEQ ID NO: 1; and the ZlMYB2 gene has the nucleotide sequence set forth in SEQ ID NO: 2. In the present disclosure, the ZlMYB1 and ZlMYB2 genes can be effectively overexpressed in rice. When a growth environment is consistent with that of a control plant, rice seeds from a rice plant overexpressing the ZlMYB1 and ZlMYB2 genes turn black and have a significantly increased anthocyanidin content compared with those from the control plant.

5 Claims, 9 Drawing Sheets

Specification includes a Sequence Listing.

(A)

(B)

(A)

(B)

(C)

(A)

(B)

(C)

(A)

(B)

(C)

USE OF ZLMYB1 AND ZLMYB2 GENES FROM *ZIZANIA LATIFOLIA* IN INCREASING ANTHOCYANIDIN CONTENT OF RICE SEED

CROSS REFERENCE TO RELATED APPLICATION

This patent application claims the benefit and priority of Chinese Patent Application No. 202310429222.4 filed with the China National Intellectual Property Administration on Apr. 21, 2023, the disclosure of which is incorporated by reference herein in its entirety as part of the present application.

REFERENCE TO SEQUENCE LISTING

A computer readable XML file entitled "HLP20230806455", that was created on Nov. 9, 2023, with a file size of about 16,707 bytes, contains the sequence listing for this application, has been filed with this application, and is hereby incorporated by reference in its entirety.

TECHNICAL FIELD

The present disclosure belongs to the technical field of plant genetic engineering, and particularly relates to use of ZlMYB1 and ZlMYB2 genes from *Zizania latifolia* in increasing an anthocyanidin content of a rice seed.

BACKGROUND

Flavonoid compounds, such as anthocyanidins, flavonols, and proanthocyanidins, are the major secondary metabolites of plants. Colored rice shows different colors, such as brown, red, purple, and black, mainly due to its rich content of different types of flavonoid compounds. Purple and black seed coats are generally formed by the accumulation of anthocyanidins, while brown and red seed coats are formed by the accumulation of proanthocyanidins. Anthocyanidins are water-soluble flavonoid pigments with a basic structure of $C_6$-$C_3$-$C_6$. On this basis, the anthocyanidins can be combined with different substituents to generate six major categories of anthocyanidins, including pelargonidin, cyanidin, peonidin, petunidin, delphinidin, and malvidin. These anthocyanidins determine color phenotypes of plants such as flower color, fruit color, leaf color and so on, giving the color of plants rich and colorful, which play a role in attracting insect pollination and improving the plant's ability to resist adverse environments. Meanwhile, these anthocyanidins also serve as powerful and effective free radical scavengers, which can scavenge free radicals and protect plants from strong light exposure. In addition, anthocyanidins play an important role in promoting human health. Studies have proven that anthocyanidins can reduce reactive oxygen species (ROS) in vivo, reduce the incidence rates of diabetes, inflammations, allergies, obesity, and heart disease, inhibit the growth rate of tumors, improve the digestive system, and even have certain anti-aging and life-extending functions. At present, anthocyanidins have been widely used in food coloring, medicine, cosmetics and other fields.

Currently, most cultivated rice shows a white seed coat. However, black rice has attracted much attention due to its organoleptic properties and high nutritional value as well as its health properties. Genetic studies have shown that the black rice originates from an acquired mutation in a bHLH-type transcription factor kala4 (also known as OsB2). This mutation causes the originally barely-expressed kala4 to up-regulate its expression in the seed coat and leaves significantly, thereby activating the expression of corresponding anthocyanidin synthesis genes. There are many regulatory proteins in the anthocyanidin synthesis pathway that control the spatio-temporal expression of key genes for anthocyanidin synthesis. Among them, three types of transcription factors, MYB, bHLH, and WD40 repeat proteins, are the main transcription factors that regulate the synthesis of flavonoids. The MYB-like transcription factors can regulate anthocyanidin synthesis genes alone, or form a MYB-bHLH-WD40 (MBW) complex with the bHLH and WD40 to activate the expression of structural genes. In purple-leaf rice, OsC1, a homologous gene of ZmC1 in maize, is an R2R3-MYB transcription factor; OsB1 and OsB2 are homologous to a bHLH-like transcription factor booster 1 in maize; and OsWD40 is a WD40 transcription factor. The researchers have confirmed that OsC1, OsB1/OsB2, and OsWD40 can form the MBW complex to activate the expression of anthocyanidin synthesis genes in rice leaves. It is worth noting that, recent studies have found that OsMYB3 is a key R2R3-MYB transcription factor that controls anthocyanidin synthesis in rice seeds. Knocking out the OsMYB3 in a black rice variety "Zixiangnuo No. 1" results in the change of its seed coat from black to brown, and the anthocyanidin content of its seed is significantly reduced to below a limit of detection (LOD). Therefore, the complex anthocyanidin synthesis pathway involves a series of genes and proteins that form, modify, and transport metabolites. Accordingly, there are more MYB transcription factors or MBW complexes that need to be discovered by researchers.

*Zizania latifolia* is originated in China, belongs to Gramineae family the same as rice, and is distributed in China, Japan, South Korea, and Southeast Asia. *Zizania latifolia* resources are extremely abundant in China, especially in some water surfaces of the middle and lower reaches of the Yangtze River and the Huaihe River basin. Researches show that wild *Zizania latifolia* from the middle and lower reaches of the Yangtze River is a desirable candidate for domestication of cereal crops. The caryopsis of *Zizania latifolia* is called Chinese wild rice, which has been regarded as food in China for more than 3,000 years. As a kind of whole grain that contains phenolic acids, flavonoids, and other phytochemicals, the Chinese wild rice shows excellent antioxidant properties and a high potential in functional food ingredients. There are 159 kinds of flavonoid compounds in Chinese wild rice. Compared with rice, there are 72 up-regulated and 6 down-regulated flavonoid compounds in the Chinese wild rice, respectively, where the 72 up-regulated flavonoid compounds may be related to the brown-black seed coat of Chinese wild rice seeds. It is reported that the Chinese wild rice has an anthocyanidin content as high as (258.00±17.31) mg/100 g. In summary, the discovery of regulatory genes related to anthocyanidin biosynthesis in *Zizania latifolia* shows important practical significance and application prospects for innovating functional rice varieties rich in anthocyanidins, improving residents' dietary structure, and reducing dietary risk factors that cause chronic diseases.

SUMMARY

The objective of the present disclosure is to increase an anthocyanidin content in a rice seed. The present disclosure provides use of ZlMYB1 and ZlMYB2 genes from *Zizania latifolia* in increasing an anthocyanidin content of a rice seed. In the present disclosure, two DNA fragments containing ZlMYB1 and ZlMYB2 genes are isolated and used, respectively. After the two DNA fragments are driven to over-transcribe the ZlMYB1 and ZlMYB2 genes using a constitutive promoter, respectively, the anthocyanidin content of the rice seed is increased significantly.

Technical solutions of the present disclosure are as follows:

The present disclosure provides use of ZlMYB1 and ZlMYB2 genes from Zizania latifolia in increasing an anthocyanidin content of a rice seed, where the ZlMYB1 gene has a nucleotide sequence set forth in SEQ ID NO: 1, with a total of 762 nucleotides; and the ZlMYB2 gene has a nucleotide sequence set forth in SEQ ID NO: 2, with a total of 774 nucleotides.

Further, a protein encoded by the ZlMYB1 gene has an amino acid sequence set forth in SEQ ID NO: 3, with a total of 253 amino acids; and a protein encoded by the ZlMYB2 gene has an amino acid sequence set forth in SEQ ID NO: 4, with a total of 257 amino acids.

Further, overexpression vectors of proteins encoded by the ZlMYB1 and ZlMYB2 genes are transferred into control rice to obtain transgenic rice varieties capable of overexpressing ZlMYB1 and ZlMYB2, respectively.

Further, sequences of the ZlMYB1 and ZlMYB2 genes are separately constructed on an overexpression vector PC2300S, the obtained overexpression vectors are separately transferred into control rice, and a transgenic rice plant with a significantly increased anthocyanidin content in seeds is obtained by increasing an expression level of mRNA of the ZlMYB1 gene or the ZlMYB2 gene.

Further, the overexpression vector is transformed into an Agrobacterium strain through chemical transformation to obtain an independent transformant by infecting a callus with the Agrobacterium strain, and the independent transformant is subjected to plant regeneration to obtain the transgenic rice.

Beneficial Effects

In the present disclosure, a genomic DNA of Zizania latifolia is amplified by PCR technology to obtain genomic DNA fragments with encoding sequences of ZlMYB1 and ZlMYB2 genes, respectively. These two encoding sequences are constructed into an overexpression vector PC2300S separately, and the expression vector is used to transform rice. A transgenic rice plant with a significantly increased anthocyanidin content in seeds can be obtained by increasing an expression level of mRNA of the ZlMYB1 gene or the ZlMYB2 gene.

The present disclosure provides use of overexpressing ZlMYB1 and ZlMYB2 genes in increasing an anthocyanidin content of a rice seed. In the present disclosure, the ZlMYB1 and ZlMYB2 genes can be effectively overexpressed in rice. Under the same growth environment as a control plant, seeds harvested from rice overexpressing the ZlMYB1 or ZlMYB2 genes have higher total phenol, total flavonoid, and total anthocyanidin contents, as well as higher DPPH free radical scavenging ability and ABTS·+ free radical absorbing ability. This shows that overexpression of ZlMYB1 and ZlMYB2 genes has an effective regulatory effect on the synthesis pathway of anthocyanidin compounds in rice, increasing the anthocyanidin content in transgenic rice seeds, thereby causing the rice seeds to change from brown to black.

In the present disclosure, based on the sequencing results of Zizania latifolia genome, the ZlMYB1 and ZlMYB2 genes that control anthocyanidin synthesis are cloned in the Zizania latifolia through rice genome alignment and collinearity analysis. Biological functional verification has showed that the overexpression of ZlMYB1 and ZlMYB2 genes causes a significant increase in the anthocyanidin content in transgenic rice seeds. In the present disclosure, the biological functions of the ZlMYB1 and ZlMYB2 genes, as well as application pathways and methods thereof, are confirmed.

BRIEF DESCRIPTION OF THE DRAWINGS

(FIG. 1B) is the physical map of the ZlMYB2 overexpression vector.

(FIG. 2B) is the agarose gel electrophoresis image for identification of plants transformed with the ZlMYB2 overexpression vector; and M represents a DL2000 marker, B represents a blank control, N represents a negative control, and P represents a positive control (FIG. 3A) is the control rice obtained by culturing seeds of Zixiangnuo No. 1 with the OsMYB3 gene knocked out; (FIG. 3B) is the rice obtained by culturing control rice seeds transfected with the ZlMYB1 gene; and (FIG. 3C) is the rice obtained by culturing control rice seeds transfected with ZlMYB2 gene.

(FIG. 4A) is the rice obtained by culturing seeds of Zixiangnuo No. 1 with the OsMYB3 gene knocked out; (FIG. 4B) is the rice obtained by culturing control rice seeds transfected with the ZlMYB1 gene; and (FIG. 4C) is the rice obtained by culturing control rice seeds transfected with ZlMYB2 gene.

(FIG. 5A) is the seeds of control rice obtained by culturing seeds of Zixiangnuo No. 1 with the OsMYB3 gene knocked out; (FIG. 5B) is the seeds of rice obtained by culturing control rice seeds transfected with the ZlMYB1 gene; and (FIG. 5C) is the seeds of rice obtained by culturing control rice seeds transfected with ZlMYB2 gene;

DETAILED DESCRIPTION OF THE EMBODIMENTS

Figure 1A:
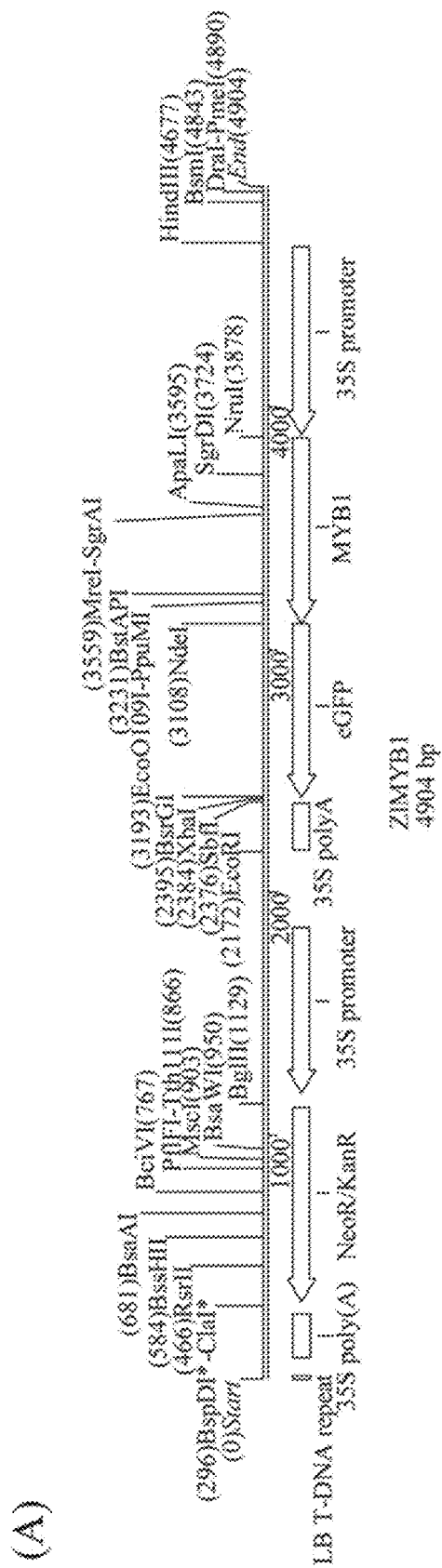
FIGS. 1A-B show physical maps of overexpression vectors in Example 2; where (FIG. 1A) is the physical map of the ZlMYB1 overexpression vector.

The biological materials used in the following examples were: *Zizania latifolia* was collected from Huai'an City, Jiangsu Province, China; control rice was Zixiangnuo No. 1 rice with (with a nucleotide sequence set forth in SEQ ID NO:12) knocked out, and its seeds were from Wuhan City, Hubei Province, China.

Example 1: Acquisition of ZlMYB1 and ZlMYB2 Genes 1.1 Extraction of Total RNA from *Zizania latifolia* and Preparation of cDNA (1) Extraction of Total RNA from *Zizania latifolia*:

RNA from *Zizania latifolia* leaves was extracted using a Polysaccharide polyphenol plant RNA Extraction Kit and then reverse-transcribed into cDNA. The extraction of RNA from *Zizania latifolia* leaves was conducted by referring to the instructions of a Plant RNA Extraction Kit, and the specific experimental method were as follows:

Step 1. A sample of the *Zizania latifolia* leaves was quickly ground into a powder in liquid nitrogen, 50 mg of the liquid nitrogen-ground sample was taken and added with 500 μL of Bufer PRL preheated at 65° C., and immediately vortex-shaken vigorously for 60 s.

Step 2. A resulting lysate was treated in a 65° C. water bath for 5 min with inverting 2 times during this period, centrifuged at 12,000 rpm for 10 min, an obtained supernatant was transferred to a new 1.5 mL RNase-free centrifuge tube, added with absolute ethanol at 0.5 times a volume of the supernatant, and mixed immediately by pipetting.

Step 3. A resulting mixture was transferred to a FastPure gDNA-Filter Column II, centrifuged at 12,000 rpm for 2 min, and a resulting filtrate was discarded.

Step 4. 500 μL of Buffer PRLPlus was added into the FastPure gDNA-Filter Column II, centrifuged at 12,000 rpm for 30 s, and a resulting filtrate was collected.

Step 5: absolute ethanol was added to the filtrate at 0.5 times a volume of same, and mixed immediately by pipetting. A resulting mixture was transferred to a FastPure RNA Column IV, centrifuged at 12,000 rpm for 2 min, and a resulting filtrate was discarded.

Step 6. 700 μL of Buffer PRW1 was added into the FasiPure RNA Column IV, allowed to stand at room temperature for 1 min, centrifuged at 12,000 rpm for 30 s, and a resulting filtrate was discarded.

Step 7. 500 μL of Buffer PRW2 was added into the FastPure RNA Column IV, centrifuged at 12,000 rpm for 30 s, and a resulting filtrate was discarded. This step was repeated once.

Step 8. The FastPure RNA Column IV was centrifuged at 12,000 rpm for 2 min without agents, to remove the remaining Buffer PRW2 in the FastPure RNA Column IV.

Step 9. The FastPure RNA Column IV was transferred to a new 1.5 mL RNase-free centrifuge tube, 40 μL of RNase-free ddH$_2$O was added dropwise into the center of a membrane of the adsorption column, allowed to stand at room temperature for 2 min, and centrifuged at 12,000 rpm for 1 min.

(2) Preparation of cDNA:

After RNA extraction, a concentration of the RNA was measured, and 2.0 μg of the RNA was taken from each sample as a substrate for reverse transcription. The reverse transcription was conducted using a reverse transcription kit to obtain a cDNA product, which was stored in a −20° C. refrigerator for later use.

TABLE 1

| PCR system and program for reverse transcription | | |
|---|---|---|
| Component | System | |
| ddH$_2$O | 5 μL | 10 μL |
| Oligo dT Primer | 1 μL | |
| dNTP Mixture | 2 μL | |
| RNA | 2 μg | |
| PCR: 65° C., 5 min; | | |
| Product according to above PCR | 10 μL | 20 μL |
| 5 × primerScript II Buffer | 4 μL | |
| RNase Inhibitor | 0.5 μL | |
| Primer Script II RTase | 1 μL | |
| RNase-free dH$_2$O | 4.5 μL | |
| PCR: 42° C., 1 h; 70° C., 15 min | | |

1.2 Amplification of ZlMYB1 and ZlMYB2 Genes

The primers designed based on the ZlMYB1 gene sequence were as follows:

```
Z1MYB1-F:
                                   (SEQ ID NO: 5)
5'-TCGAGCTTTCGCGAGCTCGGTACCATGAAGAGAGGGGCATGGA

C-3';

Z1MYB1-R:
                                   (SEQ ID NO: 6)
5'-CTGCAGGTCGACTCTAGAGGATCCCTACTCCGCATGAGGTTGG

G-3'.
```

PCR amplification was conducted using the cDNA of ZlMYB1 prepared in 1.1 as a template and the above primers, to obtain a target fragment ZlMYB1.

The primers designed based on the ZlMYB2 gene sequence were as follows:

ZlMYB2-F:
(SEQ ID NO: 7)
5'-TCGAGCTTTCGCGAGCTCGGTACCATGGGGAGGAGGGCGTGCTG-3';

ZlMYB2-R:
(SEQ ID NO: 8)
5'-CTGCAGGTCGACTCTAGAGGATCCCTACTTCGCATGAAGCCGCT-3'.

PCR amplification was conducted using the cDNA of ZlMYB2 prepared in 1.1 as a template and the above primers, to obtain a target fragment ZlMYB2.

The system and reaction procedures of PCR amplification were as follows:

TABLE 2

PCR system and program

| Component | System |
|---|---|
| cDNA | 1 μL |
| 10 × Buffer | 5 μL |
| dNTP Mixture (10 mM) | 1 μL |
| Primer F (10 μM) | 1 μL |
| Primer R (10 μM) | 1 μL |
| KOD (1 U/μL) | 1 μL |
| ddH$_2$O | up to 50 μL |

PCR program

| Step | Number of cycles |
|---|---|
| 94° C. for 5 min | 1 |
| 98° C. for 30 s | 32 |
| 56° C. for 30 s | |
| 68° C. for 2 min | |
| 68° C. for 5 min | 1 |
| 25° C. for 1 min | 1 |

Figure 1B:
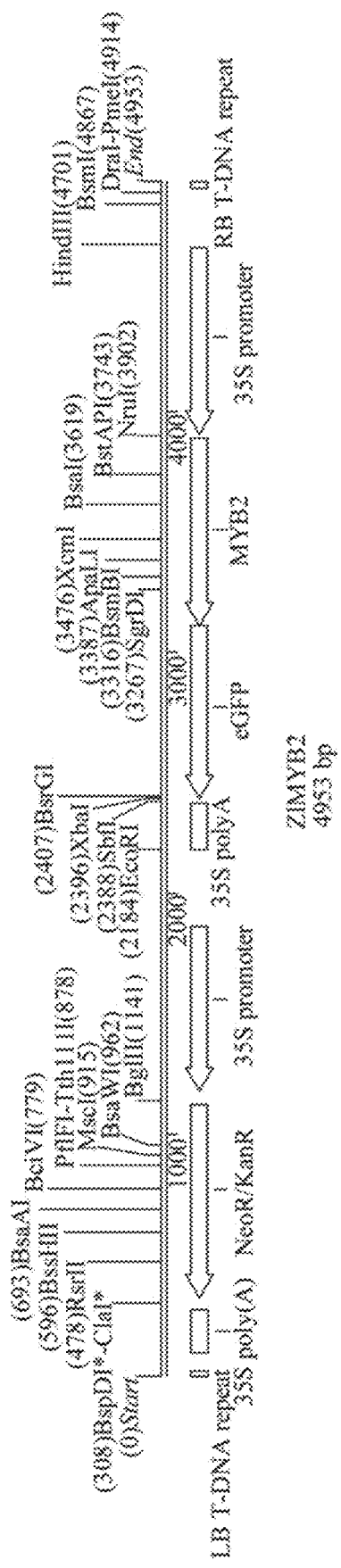
Figure 2A:
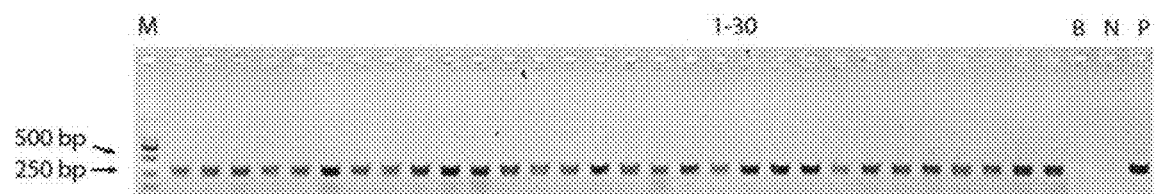
FIGS. 2A-B show an agarose gel electrophoresis image for identification of positive transgenic rice plant in Example 2; where (FIG. 2A) is the agarose gel electrophoresis image for identification of plants transformed with the ZlMYB1 overexpression vector.
Figure 2B:
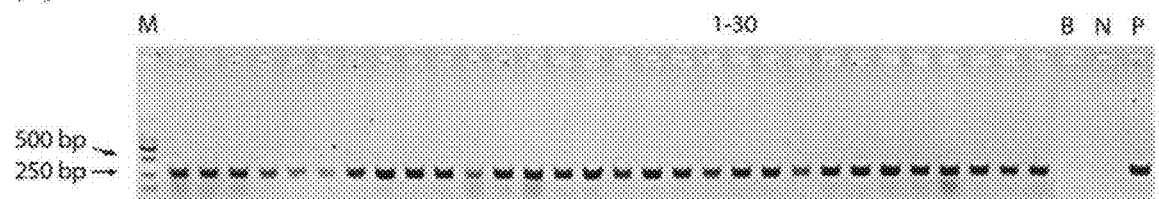
Figure 3A:
FIGS. 3A-C show phenotypic observation of a seedling emergence stage of transgenic rice in Example 3; where reference numerals.
Figure 3B:
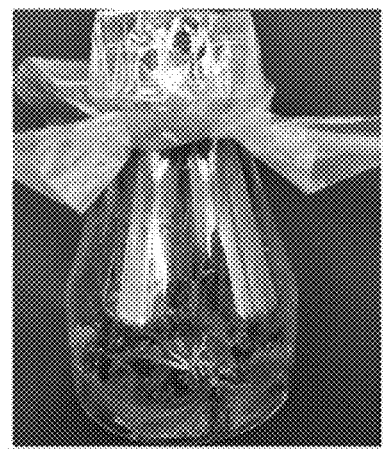
Figure 3C:
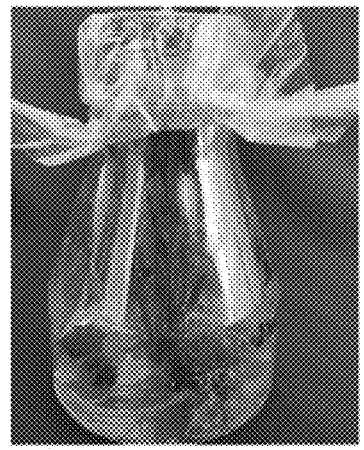
Figure 4A:
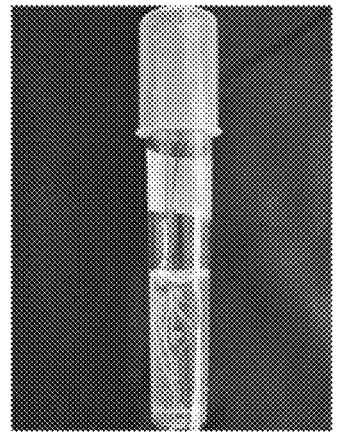
FIGS. 4A-C show phenotypic observation of a seedling emergence stage of a single transgenic rice plant in Example 3; where reference numerals.
Figure 4B:
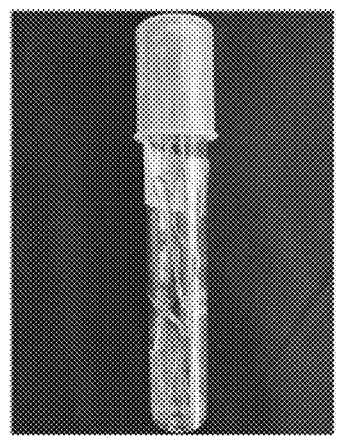
Figure 4C:
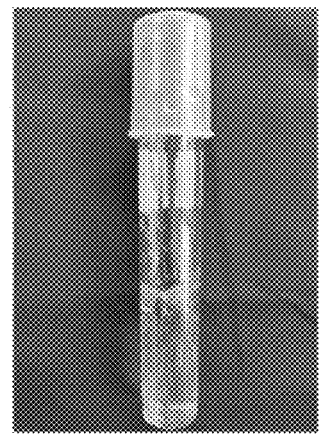

Example 2: Construction and Genetic Transformation of Overexpression Vectors for ZlMYB1 and ZlMYB2 Genes 2.1 Construction of Overexpression Vectors for ZlMYB1 and ZlMYB2 Genes A vector PC2300S was digested with restriction enzymes SacI and BamHI, obtained digested products were separated by agarose gel electrophoresis, and a linearized PC2300S large fragment was recovered using a gel recovery kit. The fragment was recombined with the PCR amplification products ZlMYB1 and ZlMYB2 in step 1.2 separately, obtained target genes were connected to different vectors, then transformed into E. coli competent cells DH5a to obtain the overexpression vector ZLMYB1 and overexpression vector ZLMYB2 (the physical maps of the overexpression vectors were shown in FIG. 1).

The obtained ligation product was transformed into E. coli DH5α cells, the specific transformation steps were: the DH5α cells stored in a −80° C. refrigerator were placed on ice for about 10 min to allow freezing and thawing in an ice bath. 10 μL of the ligation product was added to 100 μL of the DH5a, mixed well by pipetting, and then incubated in ice bath for 30 min; the mixture was subjected to heat shock in a 42° C. water bath for 90 s, and quickly transferred to ice bath for 2 min; added with 1 mL of an antibiotic-free LB liquid medium on an ultra-clean bench, and conducted recovery for culturing in a shaker at 220 rpm at 37° C. for 45 min to 60 min; a resulting recovered bacterial solution was centrifuged at 6,000 rpm for 5 min. 500 μL of an obtained supernatant was collected using a pipette, 500 μL of the medium was retained to resuspend precipitated bacterial cells, and the resuspended bacterial cells were plated onto plates; the plates were cultured upside down in an incubator at 37° C. overnight, and positive clones were picked and cultured overnight on a shaker at 37° C. and 220 rpm.

A PCR primer PCB-seqE of the bacterial solution was designed as follows: 5'-GCACCCCAGGCTTTACACTT-3' (SEQ ID NO: 9). The primer PCB-seqE (SEQ ID NO: 9) and ZlMYB1-F (SEQ ID NO: 5) were subjected to colony PCR to detect ZlMYB1 single clone positivity. The primer PCB-seqE (SEQ ID NO: 9) and ZlMYB2-F (SEQ ID NO: 7) were subjected to colony PCR to detect ZlMYB2 single clone positivity. The product of colony PCR was electrophoresed to select single colonies with a target band, and then sequenced. The PCR product had a nucleotide sequence consistent with the sequences of SEQ ID NO: 1 and SEQ ID NO: 2.

A plasmid was extracted and transformed into Agrobacterium EHA105 competent cells. The operation method is as follows:

Step 1. The Agrobacterium EHA105 competent cells stored at −80° C. were taken, placed at room temperature or in the palm of hand for a while until they were partially melted, and then inserted into ice when they were in an ice-water mixed state.

Step 2: 5 μL of the extracted plasmid was added into per 100 μL of the Agrobacterium-infected EHA105 competent cells, mixed by tapping the bottom of the tube with hand, and then allowed to stand on ice for 5 min, in liquid nitrogen for 5 min, in a 37° C. water bath for 5 min, and in an ice bath for 5 min sequentially.

Step 3. 700 μL of antibiotic-free LB liquid medium was added to allow shaking culture at 28° C. for 2 h to 3 h.

Step 4. A resulting culture product was centrifuged at 6,000 rpm for one minute to collect the bacterial cells, 100 μL of a supernatant was left to resuspend the bacterial cells by gently pipetting, the cells were plated onto an LB plate containing kanamycin, and the LB plate was placed upside down in a incubator to incubate at 28° C. for 2 d to 3 d.

2.2 Acquisition and Identification of ZlMYB1 and ZlMYB2 Transgenic Rice (1) Preparation of Callus Step 1. Sterilization of mature rice seeds. The mature rice seeds were hulled with a suitable tool, and seeds with mildew spots and underdeveloped embryos (shrunken, brown) were discarded to ensure the integrity and purity of the seeds. Hulled rice seeds were washed with 75% ethanol for 1 min, sterilized with 0.15% HgCl$_2$ for 15 min to 20 min, and finally washed 4 to 5 times with sterile ddH$_2$O, and soaked overnight at the last time.

Step 2. Induction of rice callus: The seeds soaked overnight were washed with sterilized water; embryos of which were peeled off along an aleurone layer using a scalpel, and inoculated on an induction medium, where 8 to 12 sterilized rice seeds were inoculated into each bottle of the induction medium and cultured at 30° C. in the dark for 40 d to 45 d to induce callus production.

Step 3. Subculture of callus: The pale yellow, granular, and dry callus with strong vitality were selected from the induced callus, transferred into a subculture medium, and cultured in the dark for 20 d; during the first subculture, other tissues (such as endosperm, buds) attached to the callus should be removed. The callus that had been subcultured once can be infected with *Agrobacterium tumefaciens*; the callus used for transformation was subcultured up to two times, since multiple subcultures might easily cause somatic mutations in the callus and reduce transformation efficiency.

Step 4. Pre-culture of callus: The pale yellow, granular, and dry callus with strong vitality were selected from the subcultured callus, each dish was inoculated with 60 to 80 mung bean-sized callus particles, larger callus particles could be crushed with tweezers, and the callus was pre-cultured at 28° C. in the dark for 3 d to 4 d. After the pre-culture, callus small particles in well conditions and vigorously dividing state were collected with a spoon into a 250 mL sterile Erlenmeyer flask to allow the *Agrobacterium* infection.

(2) Preparation of *Agrobacterium*

Step 1. Activation of *Agrobacterium*: 2 d before the experiment, an *Agrobacterium tumefaciens* strain containing the target gene was streaked on an LA plate containing corresponding antibiotics, and then cultured at 28° C. for 2 d.

Step 2. Resuspension of *Agrobacterium*: The plate streaked with the *Agrobacterium tumefaciens* was taken out, about a ring of the *Agrobacterium* from which was inoculated into 100 mL of a suspension medium using an inoculating loop, added with 100 μL of an acetosyringone stock solution and 2 mL of 50% glucose, and then cultured in a constant-temperature shaker at 28° C. and 200 rpm for 30 min to obtain an *Agrobacterium* suspension with a concentration of approximately $OD_{600}=0.3$.

(3) *Agrobacterium* Infection and Liquid Co-Culture

Step 1. *Agrobacterium* infection: The *Agrobacterium* suspension was poured into an Erlenmeyer flask containing the callus until all the callus was submerged, and then allowed to stand for 10 min. The *Agrobacterium* suspension was discarded. A sterilized small flat dish filled with absorbent paper and filter paper was taken, the Erlenmeyer flask containing the callus was placed upside down on the filter paper of the small flat dish to discard the bacterial solution as much as possible. The callus was spread on filter paper in a sterile large flat dish, covered with a piece of sterilized filter paper, the filter paper was gently pressed with tweezers to absorb the bacterial solution on a surface of the callus, and then the moisture-absorbed filter paper was removed. The filter papers at top and bottom were changed four times in this way, and finally the callus was covered with a piece of filter paper, the large flat dish was covered and then air-dried naturally for 1 h to 2 h.

Step 2. Co-culture: The dried callus particles were transferred to a co-culture medium using tweezers and sealed with a sealing film. The callus particles were cultured in the dark at 19° C. for 3 d.

Step 3. Water washing: The co-cultured callus was transferred to a water-washing cup, sterilized distilled water was poured until the callus was completely submerged, the cup was covered to shake for 20 s to 30 s, and the sterilized distilled water was discarded. The water washing was repeated 3 to 4 times. Observation was conducted: if the distilled water in the water-washing cup was clear, it meant that the *Agrobacterium* had been basically cleaned, otherwise the water washing was repeated. The sterile distilled water was discarded, sterile distilled water containing 500 mg/L carbenicillin was added, and allowed to stand for 30 min. The sterile distilled water containing 500 mg/L carbenicillin was discarded.

Step 4. Screening of callus: After the callus was dried, the callus particles were transferred to a screening medium using tweezers, sealed with a sealing film, and placed in a dark culture room to allow screening culture for 20 d (denoted as first screening $S_1$). The dry callus without *Agrobacterium* contamination was transferred from the $S_1$ medium to an $S_2$ medium. The callus was cultured in the dark for 20 d, and it was observed whether fresh and bright yellow callus with resistant had grown. If no callus with resistant had formed yet, the callus was transferred to new dishes for $S_3$ screening culture. Generally, japonica rice varieties could grow callus with resistant after being screened twice, that is, in the $S_2$ stage.

Step 5. Differentiation culture: The small pieces of callus with resistant that were light yellow, dense, dry, and vigorously growing were selected, where only one small piece of callus with resistant was selected from each group, and attention should not be paid to the callus with *Agrobacterium*. 3 to 4 small pieces of callus with resistant was evenly placed in each bottle of differentiation medium, that is because callus cells could continue to grow on the differentiation medium, if placed too densely, different callus blocks can easily grow together and cannot be distinguished. The callus was cultured at 28° C. for 30 d to 40 d under illumination (16 h light/8 h dark), rooting culture could be started after the callus were differentiated into seedlings and the seedlings had a height of 3 cm to 5 cm. During the illumination culture, materials contaminating bacterial growth should be cleaned up in time.

Step 6. Rooting of plants: The seedlings obtained after differentiation were taken out from the differentiation medium with gun-shaped tweezers and placed in a sterilized empty flat plate, where only one strong seedling was taken from one callus. The seedlings were cleaned with scissors to remove dead or yellowed leaves and roots growing on the differentiation medium. The seedlings were inoculated into rooting tubes, with one seedling inoculated into each tube. The rooting culture was conducted in a light culture room for 15 d to 20 d, and transplanting was started after the new roots had grown sufficiently.

Step 7. Transplanting of plants: After uncovering the sealing film of the rooting tube, tap water was added, and seedling hardening was conducted in the light culture room for 3 d to 4 d. During the seedling hardening, leaf samples could be taken for transgenic positive testing. The transformed seedlings were taken out of the rooting tube, attached medium on their roots was washed, and the seedlings were transplanted into a pot or bucket with prepared soil.

(4) Preparation of Reagents and Culture Media Used in Transformation:

1) Abbreviations of reagents and solutions: in the present disclosure, the abbreviations of plant hormones used in the medium were as follows: 6-BenzylaminoPurine (6-BA), namely 6-benzyladenine; Indole-3-acetic acid (IAA); Napthalene acetic acid (NAA); 2,4-Dichlorophenoxyacetic acid (2,4-D); and Kinetin (KT), namely 6-glycosylaminopurine.

2) Formula of main solutions:

1, $MS_{max}$ stock solution (10×): 16.5 g $NH_4NO_3$, 1.7 g $KH_2PO_4$, 19.0 g $KNO_3$, 3.7 g $MgSO_4 \cdot 7H_2O$, 3.32 g $CaCl_2$), or 4.4 g $CaCl_2 \cdot 2H_2O$ were dissolved in sequence and diluted to 1,000 mL at room temperature.

2, $MS_{min}$ stock solution (100×): 2.23 g $MnSO_4 \cdot 4H_2O$, 0.86 g $ZnSO_4 \cdot 7H_2O$, 0.083 g KI, 0.62 g $H_3BO_3$, 0.025 g $Na_2MoO_4 \cdot 2H_2O$, 0.0025 g $CoCl_2 \cdot 6H_2O$, and 0.0025 g $CuSO_4 \cdot 5H_2O$ were dissolved in sequence and diluted to 1,000 mL at room temperature.

3, $N_{6max}$ stock solution (10×): 28.3 g $KNO_3$, 4.63 g $(NH_4)SO_4$, 4.0 g $KH_2PO_4$, 1.85 g $MgSO_4 \cdot 7H_2O$, 1.25 g $CaCl_2$), or 1.66 g $CaCl_2 \cdot 2H_2O$ were dissolved in sequence and diluted to 1,000 mL at room temperature.

4, $N_{6min}$ stock solution (100×): 0.08 g KI, 0.16 g $H_3BO_3$, 0.15 g $ZnSO_4 \cdot 7H_2O$, 0.44 g $MnSO_4 \cdot 4H_2O$, or 0.3335 g $MnSO_4 \cdot H_2O$ were dissolved in sequence and diluted to 1,000 mL at room temperature.

5. $Fe^{2+}$-EDTA stock solution (100×): about 300 mL $dH_2O$ and 2.78 g $FeSO_4 \cdot 7H_2O$ were added into a reagent bottle; about 300 mL $dH_2O$ was added to another reagent bottle, heated to 70° C., and then added with 3.73 g $Na_2 \cdot EDTA \cdot 2H_2O$; after all dissolved, solution I and solution II were obtained respectively, cooled to room temperature, the solutions in the two bottles were mixed, and then diluted with $dH_2O$ to 1,000 mL, and stored in the dark at 4° C.

6. Vitamin stock solution (100×): 0.1 g niacin, 0.1 g nicotine thiamine, 1 g pyridoxine hydrochloride, 10 g myo-inositol, and 0.2 g glycine were diluted with $dH_2O$ to 1,000 mL, and stored at 4° C.

7. $AA_{max}$ stock solution (10×): 29.50 g KCl, 2.50 g $MgSO_4 \cdot 7H_2O$, 1.50 g $NaH_2PO_4$, and 1.50 g $CaCl_2 \cdot 2H_2O$ were diluted with $dH_2O$ to 1,000 mL, and stored at room temperature in the dark.

8, $AA_{min}$ stock solution (100×): 1.0 g $MnSO_4 \cdot H_2O$, 0.2 g $ZnSO_4 \cdot 7H_2O$, 0.0025 g $CuSO_4 \cdot 5H_2O$, 0.3 g $H_3BO_3$, 0.075 g KI, 0.0025 g $CoCl_2 \cdot 6H_2O$, 0.025 g $NaMoO_4 \cdot 2H_2O$ were diluted with $dH_2O$ to 1,000 mL, and stored at room temperature in the dark.

9. 6-BA stock solution (1 mg/mL): 1.0 mL 1N KOH was added to 100 mg 6-BA and shaken until the 6-BA was dissolved, diluted to 100 mL with $dH_2O$ and stored at room temperature.

10. KT stock solution (1 mg/mL): 1.0 mL 1N KOH was added to 100 mg KT and shaken until the KT was dissolved, diluted to 100 mL with $dH_2O$ and stored at room temperature.

11. 2,4-D stock solution (1 mg/mL): 1.0 mL 1N KOH was added to 100 mg 2,4-D and shaken for 5 min, added with 10 mL $dH_2O$ and shaken until the 2,4-D was dissolved, and diluted to 100 mL with $dH_2O$ and stored at room temperature.

12. 100 mM acetosyringone stock solution: 0.196 g of acetosyringone and 10 mL of dimethyl sulfoxide were divided into 1.5 mL centrifuge tubes and stored at 4° C.

13. IAA stock solution (1 mg/mL): 1.0 mL 1N KOH was added to 100 mg IAA and shaken until the IAA was dissolved, diluted to 100 mL with $dH_2O$ and stored at room temperature in the dark.

14. NAA stock solution (1 mg/mL): 1.0 mL 1N KOH was added to 100 mg NAA and shaken until the NAA was dissolved, diluted to 100 mL with $dH_2O$ and stored at room temperature in the dark.

15. 1 N KOH stock solution: 5.6 g KOH was dissolved in 100 mL $dH_2O$ and stores at room temperature.

16. 0.15% $HgCl_2$: 1.5 g $HgCl_2$ was dissolved with 1 mL of absolute ethanol partially or completely, then diluted to 1,000 mL with $dH_2O$, stirred for 4 h to 8 h, and stored properly at room temperature.

3) Medium Formula for Rice Genetic Transformation:

1. Induction medium: $N_{6max}$ stock solution (10×) 100 mL, $N_{6min}$ stock solution (100×) 10 mL, Vitamin stock solution (100×) 10 mL, $Fe^{2+}$-EDTA stock solution (100×) 10 mL, 2,4-D stock solution (1 mg/mL) 2.5 mL, hydrolyzed casein 0.6 g, proline 0.3 g, sucrose 30 g and Phytagel 3 g were mixed, adjusted to a pH value of 5.9, diluted with $dH_2O$ to 1,000 mL.

2. Subculture medium: $N_{6max}$ stock solution (10×) 100 mL, $N_{6min}$ stock solution (100×) 10 mL, Vitamin stock solution (100×) 10 mL, $Fe^{2+}$-EDTA stock solution (100×) 10 mL, 2,4-D stock solution (1 mg/mL) 2.0 mL, hydrolyzed casein 0.6 g, proline 0.5 g, sucrose 30 g and Phytagel 3 g are mixed, adjusted to a pH value of 5.9, diluted with $dH_2O$ to 1,000 mL.

3. Pre-culture medium: $N_{6max}$ stock solution (10×) 12.5 mL, $N_{6min}$ stock solution (100×) 1.25 mL, Vitamin stock solution (100×) 2.5 mL, $Fe^{2+}$-EDTA stock solution (100×) 25 mL, 2,4-D stock solution (1 mg/mL) 0.75 mL, acetosyringone stock solution 300 µL, 50% glucose solution 5 mL, hydrolyzed casein 0.15 g, sucrose 5 g and agarose 1.75 g were mixed, adjusted to a pH value of 5.4, added with $dH_2O$ to 250 mL.

4. Co-culture medium: $N_{6max}$ stock solution (10×) 12.5 mL, $N_{6min}$ stock solution (100×) 1.25 mL, Vitamin stock solution (100×) 2.5 mL, $Fe^{2+}$-EDTA stock solution (100×) 25 mL, 2,4-D stock solution (1 mg/mL) 0.75 mL, acetosyringone stock solution 300 µL, 50% glucose solution 5 mL, hydrolyzed casein 0.2 g, sucrose 5 g and agarose 1.75 g were mixed, adjusted to a pH value of 5.4, added with $dH_2O$ to 250 mL.

5. Suspension medium: $N_{6max}$ stock solution (10×) 5 mL, $N_{6min}$ stock solution (100×) 0.5 mL, Vitamin stock solution (100×) 1 mL, $Fe^{2+}$-EDTA stock solution (100×) 0.5 mL, 2,4-D stock solution (1 mg/mL) 0.2 mL, acetosyringone stock solution 100 µL, 50% glucose solution 2 mL, hydrolyzed casein 0.08 g and sucrose 2 g were mixed, adjusted to a pH value of 5.4, added with $dH_2O$ to 100 mL.

6. Screening medium: $N_{6max}$ stock solution (10×) 25 mL, $N_{6min}$ stock solution (100×) 2.5 mL, Vitamin stock solution (100×) 2.5 mL, $Fe^{2+}$-EDTA stock solution (100×) 2.5 mL, 2,4-D stock solution (1 mg/mL) 0.625 mL, 400 mg/L carbenicillin 400 µL, 50 mg/L hygromycin B 250 L, 50% glucose solution 5 mL, hydrolyzed casein 0.15 g, sucrose 7.5 g and agarose 1.75 g were mixed, adjusted to a pH value of 6.0, added with $dH_2O$ to 250 mL.

7. Differentiation medium: $MS_{max}$ stock solution (10×) 100 mL, $MS_{min}$ stock solution (100×) 10 mL, Vitamin stock solution (100×) 10 mL, $Fe^{2+}$-EDTA stock solution (100×) 10 mL, 6-BA 2.0 mL, KT 2.0 mL, IAA 0.2 mL, NAA 0.2 mL, sucrose 30 g, hydrolyzed casein 1 g and Phytagel 3 g were mixed, adjusted to a pH value of 6.0, added with $dH_2O$ to 1,000 mL.

8. Rooting medium: $MS_{max}$ stock solution (10×) 50 mL, $MS_{min}$ stock solution (100×) 5 mL, Vitamin stock solution (100×) 10 mL, $Fe^{2+}$-EDTA stock solution (100×) 10 mL, sucrose 20 g and Phytagel 3 g were mixed, adjusted to a pH value of 5.8, added with $dH_2O$ to 1,000 mL.

2.3 Identification of Overexpression Plants

The leaves of the transformed plants were cut, DNA was extracted using a CTAB method, and PCR detection was conducted using specific primers for screening marker genes.

(1) The operation method is as follows: 1 g to 2 g of freshly transformed rice leaves were placed into a mortar pre-cooled with liquid nitrogen, added with liquid nitrogen and ground to obtain a powder, the powder was transferred to a 2 mL centrifuge tube. (2) The centrifuge tube 600 µL CTAB separation buffer, inverted up and down to mix evenly, placed in a 65° C. water bath and kept for 30 min, with shaking gently every 3 min to 4 min to mix well. (3) The centrifuge tube was added with an equal volume of chloroform: isoamyl alcohol solution with a volume ratio of 24:1, inverted up and down to mix evenly, centrifuged at 12,000 rpm for 15 min, and a supernatant was transferred to a new 1.5 mL centrifuge tube. (4) The centrifuge tube was added with 0.6 times a volume of isopropyl alcohol, mixed gently, placed at −20° C. to precipitate DNA for 1 h, centrifuged at 12,000 rpm for 15 min, and a supernatant was discarded. (5) The centrifuge tube was added with 700 μL of 70% ethanol to wash the DNA precipitation, and was inverted up and down to mix evenly, centrifuged at 12,000 rpm for 5 min, a supernatant was discarded, and the DNA precipitation was placed in a clean bench to dry naturally. (6) The DNA was dissolved in ddH$_2$O and store at −20° C. for later use.

The positive identification primers for overexpression vector transformation across promoters were designed, including NPTII-F68: 5'-ACTGGGCACAACA-GACAATCG-3' (SEQ ID NO: 10), and NPTII-R356: 5'-GCATCAGCCATGATGGATACTTT-3' (SEQ ID NO: 11). The agarose gel electrophoresis images were shown in FIGS. 1A-B.

Example 3: Observation of ZlMYB1 and ZlMYB2 Transgenic Rice and Seed Phenotypes

ZlMYB1 and ZlMYB2 transgenic rice were cultured under the same greenhouse conditions as the control rice (Zixiangnuo No. 1 with OsMYB3 gene knocked out), and were given the same culture medium, culture temperature and other regeneration conditions. The materials were photographed and recorded when they grew under normal regeneration conditions until seedlings began to emerge.

Under the same growth conditions, the germination rates of ZlMYB1 and ZlMYB2 transgenic rice and the control rice (Zixiangnuo No. 1 with OsMYB3 gene knocked out) were roughly the same. As shown in FIGS. 3A-C and FIG. 4A-C, the plants and roots of the ZlMYB1 and ZlMYB2 transgenic rice were lavender, while the control rice plants were green and their roots were milky white. That is, the plants and roots of the ZlMYB1 and ZlMYB2 transgenic rice showed significant color differences from those of the control rice.

Figure 5A:
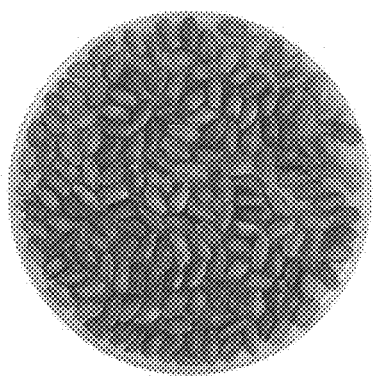
FIGS. 5A-C show phenotypic observation of ZlMYB1 and ZlMYB2 transgenic rice seeds in Example 3; where reference numerals.
Figure 5B:
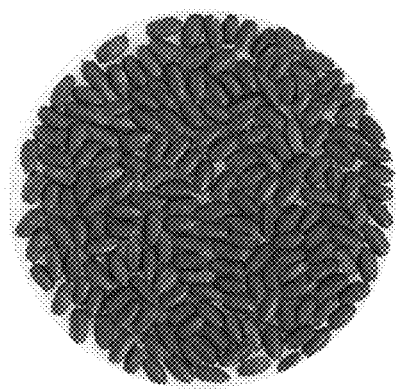
Figure 5C:
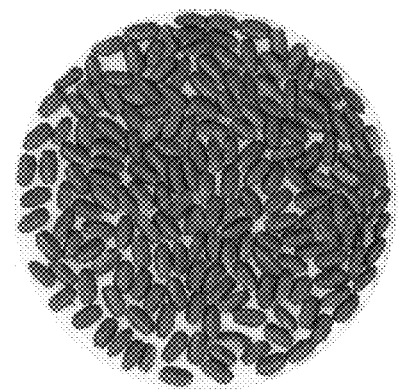

The materials were grown under normal water and fertilizer conditions to normal firmness and ripeness. The grains and ears were separated and air-dried, and the chaff of the grains was removed manually. After the chaff was removed from the grains, the seeds of the ZlMYB1 and ZlMYB2 transgenic rice plants showed significant differences in seed coat color compared to those of the control materials. The seeds of the ZlMYB1 and ZlMYB2 transgenic rice plants were black, while the seeds of the control plants were brown, as shown in FIGS. 5A-C.

Example 4: Determination of Total Phenol, Total Flavonoid, and Total Anthocyanidin Contents in ZlMYB1 and ZlMYB2 Transgenic Rice Seeds The seeds of the ZlMYB1 and ZlMYB2 transgenic rice and the seeds of the control group obtained after hulling the grains were freeze-dried to a constant weight, ground into powders, and then passed through a 100-mesh sieve.

The extraction method of total phenolic compounds in seeds, and the detection method of total phenol and total flavonoid contents of seeds came from the article "Comparison of the contents of phenolic compounds including flavonoids and antioxidant activity of rice (*Oryza sativa*) and Chinese wild rice (*Zizania latifolia*)". The method for extracting anthocyanidins and determining total anthocyanidin content in seeds came from the article "Measurement of anthocyanidins and other phytochemicals in purple wheat".

(1) Extraction of Total Phenolic Compounds in Seeds 5 mL of methanol was added to 0.2 g each of the seed powder of the ZlMYB1 and ZlMYB2 transgenic rice and the control group (accuracy was 0.0001), and ultrasonic extraction was conducted at 50° C. for 80 min. The mixture was centrifuged in a low-speed centrifuge at 4° C. and 3,000 rpm for 10 min. A supernatant was passed through a 0.22 m polar filter to obtain a free phenolic extract. 5 mL of 4 mol/L NaOH solution was added to the remaining filter residue, and hydrolyzed in a constant-temperature oscillator at 30° C. and 220 r/min for 4 h. A resulting mixture was centrifuged at 4° C. and 3,000 rpm for 10 min, and a supernatant was collected in a 40 mL glass centrifuge tube. A pH value of the supernatant was adjusted to 1.5 to 2.0 with 6 mol/L HCl, and an obtained bound phenol was extracted with 30 mL of ethyl acetate three times. The ethyl acetate mixture obtained 3 times was rotary-evaporated to dryness at 35° C. on a rotary evaporator, then 5 mL of methanol was added for ultrasonic reconstitution, a product was passed through a 0.22 m polar filter to obtain the bound phenol extract, and stored at 4° C. During measurement, equal amounts (1 mL) of free phenol and bound phenol extract were mixed to obtain a total phenolic compound solution.

(2) Determination of Total Phenolic Content in Seeds

The total phenolic content was measured using a FoLin-CiocaLteu colorimetric method. 250 μL of a triple-diluted FoLin-CiocaLteu solution was added with 250 μL of a sample solution, mixed well, and reacted at room temperature for 5 min; then added with 1 mL of ultrapure water and 250 μL of 20% Na$_2$CO$_3$, mixed thoroughly, reacted in the dark for 30 min, and centrifuged at 4° C. and 3,000 r/min for 10 min. 200 mL of a resulting supernatant was placed in a 96-well plate, and its absorbance at 725 nm was measured in a microplate reader. Each sample was measured 3 times. Anhydrous methanol was used as a blank control and gallic acid (GA) was used as a standard to establish a standard curve. The total phenolic content in each sample was represented as milligrams of equivalent gallic acid per 100 g of rice seed powder (mg GAE/100 g).

(3) Determination of Total Flavonoid Content in Seeds

Reactions were conducted in a 96-well plate. 10 μL of 5% NaNO$_2$ aqueous solution was added with 50 μL of sample extract solution, mixed well, and reacted at room temperature for 5 min, then added with 10 μL of 10% AlCl$_3$ aqueous solution, mixed well, and reacted at room temperature for 1 min, then added with 100 μL of 0.5 M NaOH solution, reacted for 10 min, and it absorbance was measured at 510 nm. Each sample was measured 3 times. Anhydrous methanol was used as a blank control and catechin (C) was used as a standard to establish a standard curve. The total flavonoid content in each sample was represented as milligrams of equivalent catechin per 100 g of rice seed powder (mg CE/100 g).

(4) Extraction of Anthocyanidin from Seeds and Determination of Total Anthocyanidin Content 0.5 g of rice flour was extracted with acidified methanol for three times, and a resulting supernatant was black rice anthocyanidin extract. Before measuring the total anthocyanidin content, two solutions were prepared: solution A: pH=1.0 solution (1.49% potassium chloride aqueous solution, with pH value adjusted by HCl); solution B: pH=4.5 solution (1.64% sodium acetate aqueous solution, with pH value adjusted by HCl). 200 μL of the sample was separately added to 1.8 mL of solutions A and B, and absorbance values at wavelengths of 520 nm and 700 nm were measured, respectively. The total anthocyanidin content was represented in terms of equivalent cyanidin-3-O-glucoside (mg C3GE/100 g), and its calculation formula was as follows:

$$\text{Anthocyanidin monomer content (mg/L)} = A \times MW \times DF \times 1000/(\varepsilon \times L)$$

A referred to the absorbance value, and a calculation method is $A=(A_{520\ nm}-A_{700}\ nm)pH_{1.0}-(A_{520\ nm}-A_{700}\ nm)pH_{4.5}$; MW referred to the molecular weight of cyanidin-3-O-glucoside (449.2 g/mol); DF referred to the dilution factor; ε referred to the molar absorbance value of cyanidin-3-O-glucoside (26,900 L/(cm×mol)); L referred to the path length of light (1 cm); and 1000 referred to the conversion factor for converting volume from milliliters to liters.

Figure 6:
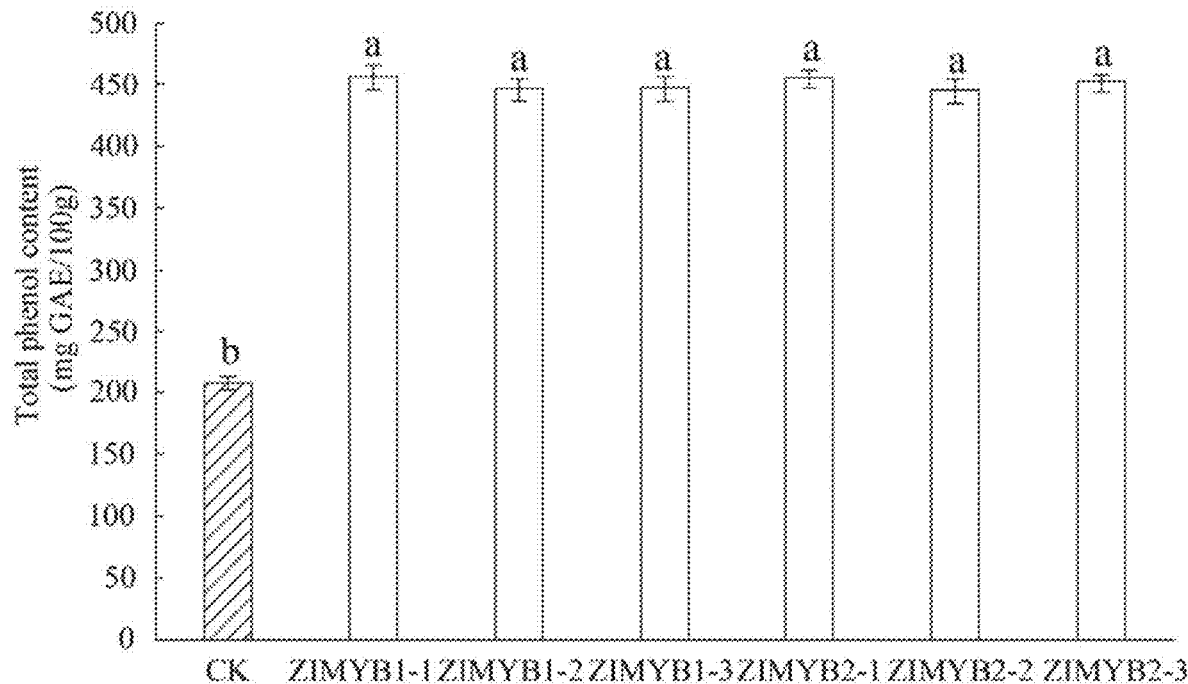
FIG. 6 shows a comparison result of a total phenol content of transgenic rice seeds derived from groups of 1 control (CK), 3 ZlMYB1 genes (ZlMYB1-1, ZlMYB1-2, and ZlMYB1-3), and 3 ZlMYB2 genes (ZlMYB2-1, ZlMYB2-2, and ZlMYB2-3) in Example 4, where the test results are mean values of three replicates, and error bars represent a standard deviation (SD), wherein the bars with different lowercase letters are significantly different (P<0.05), determined by Duncan's multiple comparison test.
Figure 7:
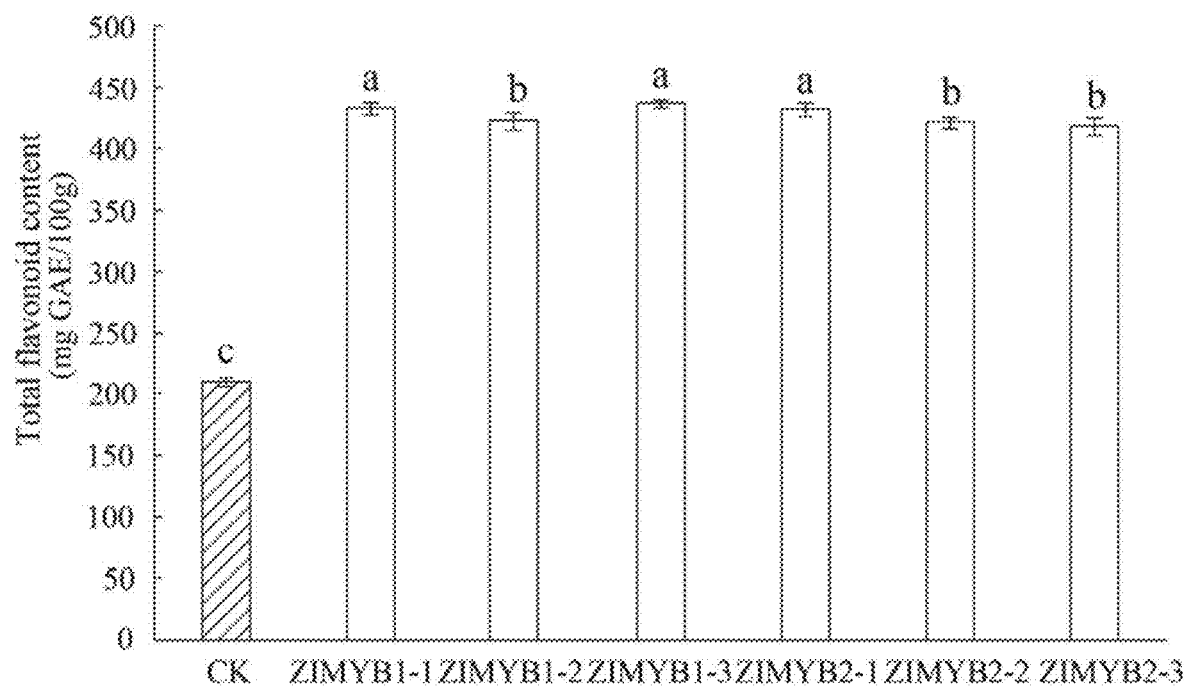
FIG. 7 shows a comparison result of a total flavonoid content of transgenic rice seeds derived from groups of 1 control (CK), 3 ZlMYB1 genes (ZlMYB1-1, ZlMYB1-2, and ZlMYB1-3), and 3 ZlMYB2 genes (ZlMYB2-1, ZlMYB2-2, and ZlMYB2-3) in Example 4, where the test results are mean values of three replicates, and error bars represent a standard deviation (SD), wherein the bars with different lowercase letters are significantly different (P<0.05), determined by Duncan's multiple comparison test.
Figure 8:
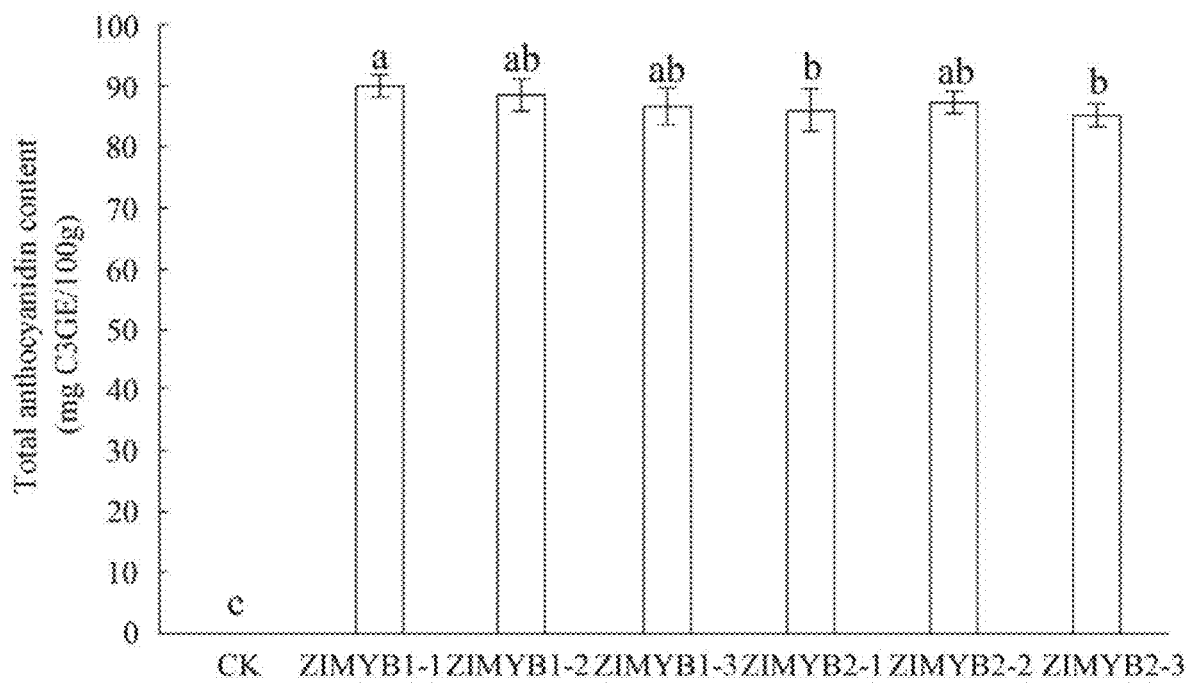
FIG. 8 shows a comparison result of a total anthocyanidin content of transgenic rice seeds derived from groups of 1 control (CK), 3 ZlMYB1 genes (ZlMYB1-1, ZlMYB1-2, and ZlMYB1-3), and 3 ZlMYB2 genes (ZlMYB2-1, ZlMYB2-2, and ZlMYB2-3) in Example 4, where the test results are mean values of three replicates, and error bars represent a standard deviation (SD), wherein the bars with different lowercase letters are significantly different (P<0.05), determined by Duncan's multiple comparison test.

The test results were shown in FIG. 6 to FIG. 8. The total phenol, total flavonoid, and total anthocyanidin contents in the seeds of the ZlMYB1 and ZlMYB2 transgenic rice were significantly higher than those of the control rice. The total phenolic and total flavonoid contents in seeds of the ZlMYB1 transgenic rice were 2.17 times and 2.06 times of those of the control rice seeds, respectively. The total phenol and total flavonoid contents in seeds of the ZlMYB2 transgenic rice were 2.17 times and 2.03 times of those of the control rice seeds, respectively. In addition, the anthocyanidin content in the seeds of the control rice was 0, while the average total anthocyanidin content in the seeds of the ZlMYB1 and ZlMYB2 transgenic rice were 86.3 and 84.1 mg C3GE/100 g, respectively.

Example 5: Determination of DPPH Free Radical Scavenging Ability and ABTS$^{\cdot+}$ Free Radical Absorbing Ability of ZMYB1 and ZlMYB2 Transgenic Rice Seeds The determination method of DPPH free radical scavenging ability and ABTS$^{\cdot+}$ free radical absorbing ability of seeds came from the article "Comparison of the contents of phenolic compounds including flavonoids and antioxidant activity of rice (*Oryza sativa*) and Chinese wild rice (*Zizania latifolia*)".

(1) Determination of DPPH free radical scavenging ability of seeds: the reaction was conducted in a 96-well plate, and 50 μL of sample was added to 150 μL of 0.5 mM DPPH methanol solution. A resulting mixture was reacted in the dark at 30° C. for 30 min, and its absorbance at 517 nm was measured using a microplate reader. Methanol was used as a blank control, and a methanol solution of vitamin E was used as a standard. The measurement for each sample was repeated 3 times, and the DPPH free radical scavenging ability was represented as the equivalent vitamin micromoles of 100 g of rice seed powder (μmol TE/100 g).

(2) Determination of the ABTS$^{\cdot+}$ free radical absorption ability of seeds: equal amounts of 1.1 mg/mL ABTS methanol solution and 0.68 mg/mL potassium persulfate aqueous solution were mixed, a resulting mixture was allowed to stand in a dark room overnight to obtain an ABTS$^{\cdot+}$ reagent, which was diluted with methanol and adjusted to absorbance of 0.700±0.020. The reaction was conducted in a 96-well plate, and 50 μL of sample was added to 150 μL of ABTS$^{\cdot+}$ solution. A resulting mixture was reacted in the dark at 30° C. for 30 min, and its absorbance at 734 nm was measured using a microplate reader. Methanol was used as a blank control, and a methanol solution of vitamin E was used as a standard. The measurement for each sample was repeated 3 times, and the ABTS$^{\cdot+}$ free radical absorbing ability was represented as the equivalent vitamin micromoles of 100 g of rice seed powder (mol TE/100 g).

Figure 9:
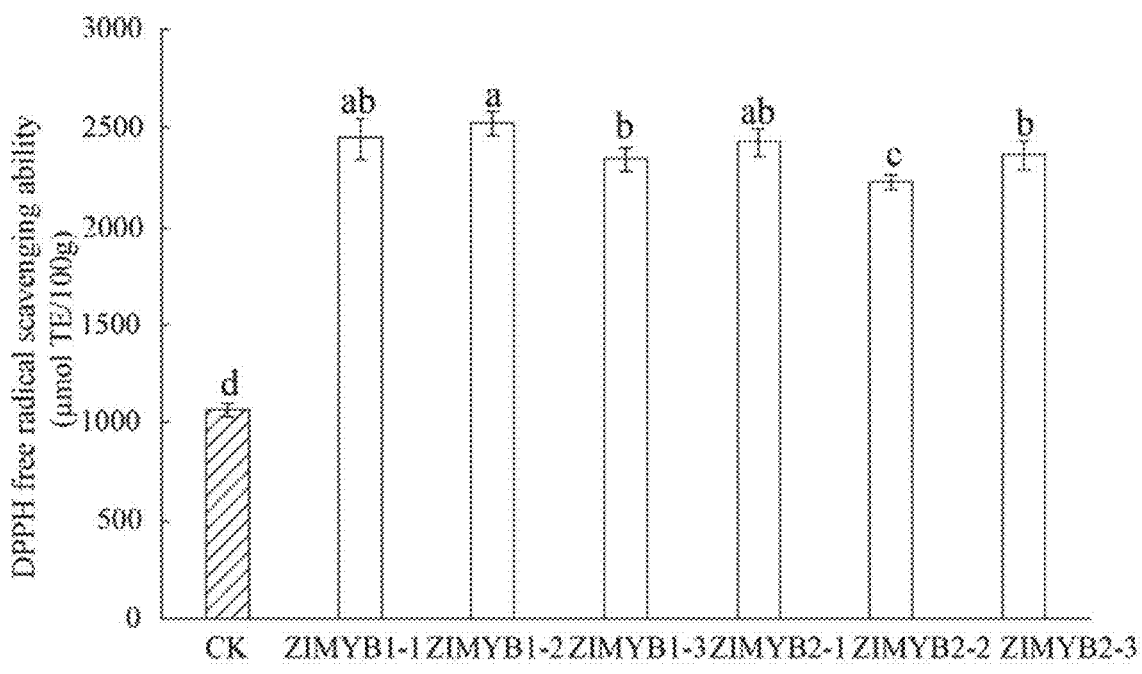
FIG. 9 shows a comparison result of a DPPH free radical scavenging ability of transgenic rice seeds derived from groups of 1 control (CK), 3 ZlMYB1 genes (ZlMYB1-1, ZlMYB1-2, and ZlMYB1-3), and 3 ZlMYB2 genes (ZlMYB2-1, ZlMYB2-2, and ZlMYB2-3) in Example 5, where the test results are mean values of three replicates, and error bars represent a standard deviation (SD), wherein the bars with different lowercase letters are significantly different (P<0.05), determined by Duncan's multiple comparison test.
Figure 10:
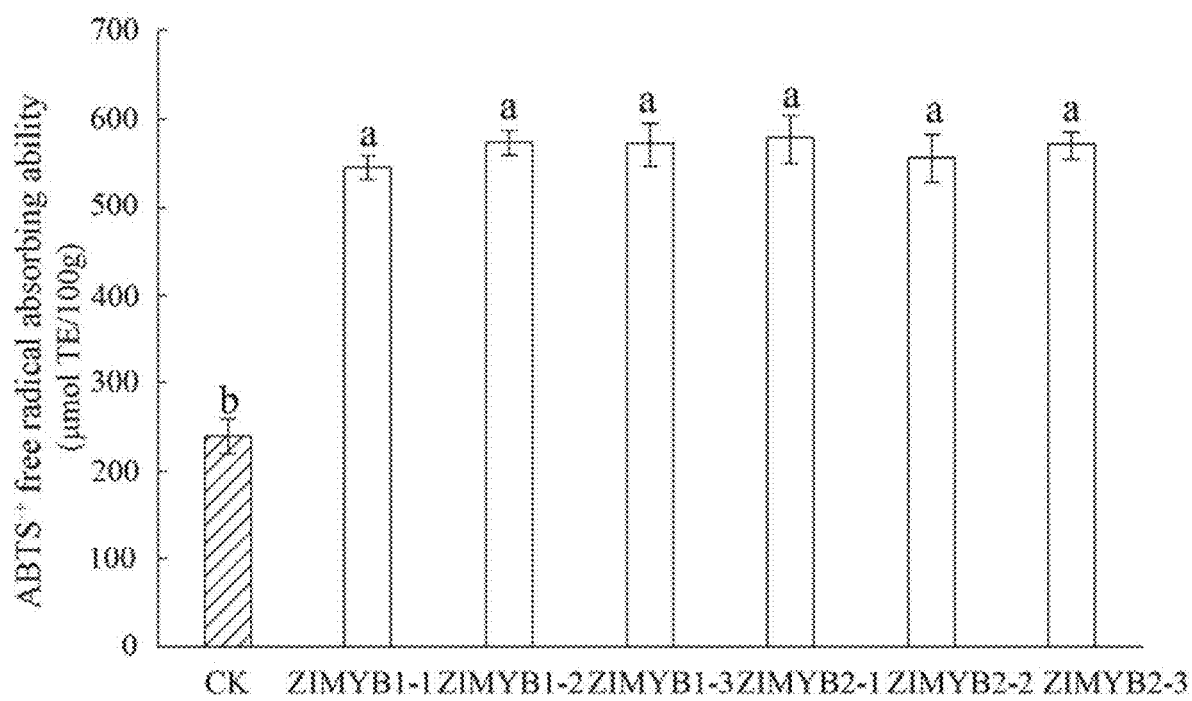
FIG. 10 shows a comparison result of an ABTS$^{·+}$ free radical absorbing ability of transgenic rice seeds derived from groups of 1 control (CK), 3 ZlMYB1 genes (ZlMYB1-1, ZlMYB1-2, and ZlMYB1-3), and 3 ZlMYB2 genes (ZlMYB2-1, ZlMYB2-2, and ZlMYB2-3) in Example 5, where the test results are mean values of three replicates, and error bars represent a standard deviation (SD), wherein the bars with different lowercase letters are significantly different (P<0.05), determined by Duncan's multiple comparison test.

The test results were shown in FIG. 9 and FIG. 10. The DPPH free radical scavenging ability and ABTS$^{\cdot+}$ free radical absorbing ability of ZlMYB1 and ZlMYB2 transgenic rice seeds were significantly higher than those of control rice seeds. The DPPH free radical scavenging ability and ABTS$^{\cdot+}$ free radical absorbing ability of ZlMYB1 transgenic rice seeds were on average 2.31 times and 2.36 times of those of the control rice seeds, respectively. The DPPH free radical scavenging ability and ABTS$^{\cdot+}$ free radical absorbing ability of ZlMYB2 transgenic rice seeds were on average 2.21 times and 2.38 times of those of the control rice seeds, respectively.

In the present disclosure, a total phenol content, a total flavonoid content, and a total anthocyanidin content in the ZlMYB1 and ZlMYB2 transgenic rice seeds were significantly higher than those of the control rice seeds. Moreover, their DPPH free radical scavenging ability and ABTS$^{\cdot+}$ free radical absorbing ability were significantly higher than those of control rice seeds. Overexpression of the ZlMYB1 and ZlMYB2 genes had the most prominent effect on increasing the total anthocyanidin content of control rice seeds. This indicated that the overexpression of the ZlMYB1 and ZlMYB2 genes in rice showed an effective regulatory effect on the synthesis pathway of anthocyanidin compounds, and effectively increased the anthocyanidin content in rice seeds.

The above are merely preferred examples of the present disclosure, and not intended to limit the present disclosure. Any modifications, equivalent replacements, and improvements made within the spirit and principle of the present disclosure should fall within the protection scope of the present disclosure.

What is claimed is:

1. A method for increasing total anthocyanidin content of a rice seed, comprising overexpressing a ZlMYB1 gene or a ZlMYB2 gene from *Zizania latifolia* in rice, wherein the ZlMYB1 gene comprises the nucleotide sequence set forth in SEQ ID NO: 1; and the ZlMYB2 gene comprises the nucleotide sequence set forth in SEQ ID NO: 2.

2. The method according to claim 1, wherein the protein encoded by the ZlMYB1 gene comprises the amino acid sequence set forth in SEQ ID NO: 3; and the protein encoded by the ZlMYB2 gene comprises the amino acid sequence set forth in SEQ ID NO: 4.

3. The method according to claim 1, wherein the overexpressing comprises transferring overexpression vectors comprising ZlMYB1 and ZlMYB2 protein-encoding genes into rice to obtain ZlMYB1- and ZlMYB2-overexpressing transgenic rice varieties, respectively.

4. The method according to claim 3, wherein the overexpression vectors comprising the ZlMYB1 and ZlMYB2 genes are separately constructed on a PC2300S vector backbone, wherein the overexpression vector comprising the ZlMYB1 gene and the overexpression vector comprising the ZlMYB2 gene are separately transferred into rice, and wherein increasing the expression level of mRNA of the ZlMYB1 gene or the ZlMYB2 gene results in a transgenic rice plant with an increased total anthocyanidin content in its seeds.

5. The method according to claim 4, wherein the overexpression vector the comprising ZlMYB1 gene or the overexpression vector the comprising ZlMYB2 gene is transformed into an *Agrobacterium* strain through chemical transformation, an independent transformant is obtained by infecting a callus with the *Agrobacterium* strain, and the independent transformant is subjected to plant regeneration to obtain the transgenic rice plant.

* * * * *

SEQUENCE LISTING

```
Sequence total quantity: 12
SEQ ID NO: 1            moltype = DNA   length = 762
FEATURE                 Location/Qualifiers
source                  1..762
                        mol_type = genomic DNA
                        note = Nucleotide sequence of ZlMYB1 gene
                        organism = Zizania latifolia
SEQUENCE: 1
atgaagagag gggcatggac gagcaaggaa gacgacatgc tggcctccta catcaaggtc   60
catggcgaag gcaaatggcg ggaggtcccc cagcgagctg gtttgcgcg gtgcggcaag   120
agctgccggc tgcggtggct gaactacctc cggcccaaca tcaagcgggg caacatctcc   180
gacgaggagg aggagctcat cgtccggctc cacaacctcc tcggcaacag gtgggctctc   240
attgcaggca ggctgcccgg ccgaacagac aatgaaatca agaactactg gaacagcacg   300
ctcggccgaa aggtcatcgg agcagtcagc cggggcggcg acacgctggc cgtcgccgcc   360
```

```
gccgccgccg ctgtggtcgc gtcgtccagc tccgtgacgg ggcagcaaga gccagctgct    420
gcgtccagcg cggacaacga cacgcggccg ccggcgacga ccgtgtgggc gcccaaggcg    480
gtgcggtgca cgcgcggctt cttcttccac agggaaacaa cgccgacgcc gccgccgccg    540
ctcgccgagg cagggtccgg gacgggagtc gacgagatg actgcagcgg cagcagctcg     600
gcgcaggcgg cgtcgtcgac gagcacattc cccgctgatg ccgagccgtg cttctccgcc    660
agcgacgact ggatggacga cgtgagagtc ctggcgtcgt tcctcgagtc cgacgagggc    720
tgggacagct ctgccaaat ggcccaacct catgcggagt ag                        762
```

SEQ ID NO: 2           moltype = DNA   length = 774
FEATURE                Location/Qualifiers
source                 1..774
                       mol_type = genomic DNA
                       note = Nucleotide sequence of ZlMYB2 gene
                       organism = Zizania latifolia
SEQUENCE: 2
```
atggggagga gggcgtgctg cgcgaaggaa gggatgaaga gagggcatg gacgagcaag       60
gaggacgaca tgctggcatc ctacatcaag gcccatggcg agggcaaatg gcgagaagtt    120
ccccagagag ctggtttgcg acggtgcggc aagagctgcg gctgcggtg gctgaactac     180
ctccggccca acatcaagcg gggcaacatc tcggacgacg aggaggagct catcgtccgg    240
ctccacaacc tcctcggcaa caggtggtct ctcattgcag gcaggctgcc gggccgaaca    300
gacaatgaaa tcaagaacta ctggaacagc acgctcggcc ggaaggtcgt cggagcagtc    360
agccggggcg gcgccggcac cccggacgct ggggccaatg tggtcgcgtc gtccatctac    420
gtgatggggc agcaacaggc tgctgcttcc agcgcggaca tcgacacgga ggcggcgacc    480
gtttgggcgc ccaaggccgt gcggtgcacg cgcggcttct tcttccatcg ggaaacgccg    540
acgccgacgc tcgccgaggc gaggacaggg gaaggcgatg gagacgactg cagcggcagc    600
ggcagcagct cggccgacgg cagcgtcgacg tcgagcacat tcccagcggg cgagccgtgc    660
ttctccacag cgacgactg gatggacgac gtgacagcct tagcgtcatt ccttgagtcc    720
gacgagggct gggacagttt gtgccaactg gcccagcggc ttcatgcgaa gtag          774
```

SEQ ID NO: 3           moltype = AA   length = 253
FEATURE                Location/Qualifiers
source                 1..253
                       mol_type = protein
                       note = Amino acid sequence of protein encoded by the ZlMYB1
                         gene
                       organism = Zizania latifolia
SEQUENCE: 3
```
MKRGAWTSKE DDMLASYIKV HGEGKWREVP QRAGLRRCGK SCRLRWLNYL RPNIKRGNIS     60
DEEEELIVRL HNLLGNRWAL IAGRLPGRTD NEIKNYWNST LGRKVIGAVS RGGDTLAVAA   120
AAAAVVASSS SVTGQQEPAA ASSADNDTAA PATTVWAPKA VRCTRGFFFH RETTPTPPPP   180
LAEAGSGTGV DGDDCSGSSS ATAASSTSTF PADAEPCFSA SDDWMDDVRV LASFLESDEG   240
WDSFCQMAQP HAE                                                     253
```

SEQ ID NO: 4           moltype = AA   length = 257
FEATURE                Location/Qualifiers
source                 1..257
                       mol_type = protein
                       note = Amino acid sequence of protein encoded by the ZlMYB2
                         gene
                       organism = Zizania latifolia
SEQUENCE: 4
```
MGRRACCAKE GMKRGAWTSK EDDMLASYIK AHGEGKWREV PQRAGLRRCG KSCRLRWLNY     60
LRPNIKRGNI SDDEEELIVR LHNLLGNRWS LIAGRLPGRT DNEIKNYWNS TLGRKVVGAV   120
SRGGAGTPDA GATVVASSIS VMGQQQAAAS SADIDTEAAT VWAPKAVRCT RGFFFHRETP   180
TPTLAEARTG EGDGDDCSGS GSSSATATST SSTFPAGEPC FSTGDDWMDD VTALASFLES   240
DEGWDSLCQL AQRLHAK                                                 257
```

SEQ ID NO: 5           moltype = DNA   length = 44
FEATURE                Location/Qualifiers
source                 1..44
                       mol_type = other DNA
                       note = ZlMYB1-F
                       organism = synthetic construct
SEQUENCE: 5
```
tcgagctttc gcgagctcgg taccatgaag agagggcat ggac                       44
```

SEQ ID NO: 6           moltype = DNA   length = 44
FEATURE                Location/Qualifiers
source                 1..44
                       mol_type = other DNA
                       note = ZlMYB1-R
                       organism = synthetic construct
SEQUENCE: 6
```
ctgcaggtcg actctagagg atccctactc cgcatgaggt tggg                      44
```

SEQ ID NO: 7           moltype = DNA   length = 44
FEATURE                Location/Qualifiers
source                 1..44
                       mol_type = other DNA
```

```
                        note = Z1MYB2-F
                        organism = synthetic construct
SEQUENCE: 7
tcgagctttc gcgagctcgg taccatgggg aggagggcgt gctg                44

SEQ ID NO: 8            moltype = DNA   length = 44
FEATURE                 Location/Qualifiers
source                  1..44
                        mol_type = other DNA
                        note = Z1MYB2-R
                        organism = synthetic construct
SEQUENCE: 8
ctgcaggtcg actctagagg atccctactt cgcatgaagc cgct                44

SEQ ID NO: 9            moltype = DNA   length = 20
FEATURE                 Location/Qualifiers
source                  1..20
                        mol_type = other DNA
                        note = Primer PCB-seqE
                        organism = synthetic construct
SEQUENCE: 9
gcacccccagg ctttacactt                                          20

SEQ ID NO: 10           moltype = DNA   length = 21
FEATURE                 Location/Qualifiers
source                  1..21
                        mol_type = other DNA
                        note = Primer NPTII-F68
                        organism = synthetic construct
SEQUENCE: 10
actgggcaca acagacaatc g                                         21

SEQ ID NO: 11           moltype = DNA   length = 23
FEATURE                 Location/Qualifiers
source                  1..23
                        mol_type = other DNA
                        note = Primer NPTII-R356
                        organism = synthetic construct
SEQUENCE: 11
gcatcagcca tgatggatac ttt                                       23

SEQ ID NO: 12           moltype = DNA   length = 966
FEATURE                 Location/Qualifiers
source                  1..966
                        mol_type = genomic DNA
                        note = Nucleotide sequence of OsMYB3 gene
                        organism = Zizania latifolia
SEQUENCE: 12
atggggagga agccgtgctg ctccaaggag gggctgaaca ggggggcatg gacggcaatg       60
gaggacgaca tcctggtgtc ctacatcgcc aagcacgggg agggcaaatg gggagccctc     120
cccaagagag ccgggctgaa gcggtgcggg aagagctgcc ggctgcggtg gctcaactac     180
ctgcggccgg ggatcaagag gggcaacatc tccggcgacg aggaggagct catcctcagg     240
ctccacactc tcctcggcaa cagatggtcg ctgatagccg ggaggctgcc ggggcgaaca     300
gacaatgaaa tcaagaacta ctggaacagc accctcagca agcgggtcgc catgcaacgg     360
accgccgccg ccaccagcat gccggcggcg gccaccacca gcagcaatgc cgacgccgcc     420
ggcgctgctg cacgacgccg gcgatcgccg gagccccgca cggtcgtcgt cagcccaatc     480
cggaccaagg cgctgcggtg caacaacaac agcagcagcg ggatagtggt ggtgcagcag     540
gcaggcgcct gcagccacgg cggccgtccg ccggagagcg gcgcgccggg agacgcggcg     600
gctgataagg tggccacgcc gcaggcggtg cagcagcagc agcagcaaga gctggccgga     660
gcggaggatg acgacgacct gccggtgccg gccgtctgta tcgaccttga cttggacgac     720
atcgagctgg gaggactcga cggcttcctg atcagcccgt ggcgcggcgg cggccacgac     780
gacggtaacg ccgccgccgg agcggtgccg aatctgccga tgccgattgg ctatgagctc     840
ggcggcgccg gtgcggtgg cgaggctgga gctgttgacc tggaggcgtt gctggggcag     900
ctggaagcag aggaagacga cgacggtgac caccaccacc accaccacca ccaccaccac     960
cagtag                                                                966
```